(12) United States Patent
Cho et al.

(10) Patent No.: US 7,370,334 B2
(45) Date of Patent: May 6, 2008

(54) ADJUSTABLE MOBILE AGENT

(75) Inventors: Kenta Cho, Tokyo (JP); Naoki Kase, Yokohama (JP); Hisashi Hayashi, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 720 days.

(21) Appl. No.: 10/206,970

(22) Filed: Jul. 30, 2002

(65) Prior Publication Data

US 2003/0023667 A1 Jan. 30, 2003

(30) Foreign Application Priority Data

Jul. 30, 2001 (JP) ............... 2001-230309

(51) Int. Cl.
*G06F 9/44* (2006.01)
*G06F 9/46* (2006.01)

(52) U.S. Cl. ...................... 719/317; 709/202
(58) Field of Classification Search ........ 709/202; 719/317
See application file for complete search history.

(56) References Cited

U.S. PATENT DOCUMENTS

| 6,148,327 | A  | * | 11/2000 | Whitebread et al. ...... 709/202 |
| 6,279,030 | B1 | * | 8/2001  | Britton et al. ............... 709/203 |
| 6,282,563 | B1 | * | 8/2001  | Yamamoto et al. ......... 709/202 |
| 6,282,582 | B1 | * | 8/2001  | Oshima et al. ............. 719/317 |
| 6,330,588 | B1 | * | 12/2001 | Freeman ..................... 709/202 |
| 6,477,563 | B1 | * | 11/2002 | Kawamura et al. ......... 709/202 |
| 6,662,207 | B2 | * | 12/2003 | Kawamura et al. ......... 709/202 |
| 6,981,251 | B1 | * | 12/2005 | Kreller et al. .............. 717/171 |
| 7,010,810 | B2 | * | 3/2006  | Ladwig ....................... 726/29 |

(Continued)

FOREIGN PATENT DOCUMENTS

| EP | 0928089 | A2 | * | 7/1999 |
| EP | 928089  | A2 | * | 7/1999 |
| EP | 0928089 | A3 | * | 3/2002 |

(Continued)

OTHER PUBLICATIONS

Nakajima, Tatsuo et al. "System Support for Migratory Continuous Media Applications in Distributed Real-Time Environments." Dec. 4, 1999.*

(Continued)

*Primary Examiner*—Lewis A. Bullock, Jr.
(74) *Attorney, Agent, or Firm*—Banner & Witcoff, Ltd.

(57) ABSTRACT

Each network-connected information processing apparatus stores restriction information defined for each agent in order to restrict the operation of the agent which moves to the self apparatus and runs. When the agent is to move from the first information processing apparatus as one of the information processing apparatuses to the second information processing apparatus as another information processing apparatus, the first information processing apparatus receives restriction information corresponding to the agent from the second information processing apparatus. The first information processing apparatus selects at least one of the components in correspondence with the second information processing apparatus on the basis of the restriction information, and moves the agent holding the selected component to the second information processing apparatus.

6 Claims, 9 Drawing Sheets

U.S. PATENT DOCUMENTS

| | | | |
|---|---|---|---|
| 2002/0052908 A1 | 5/2002 | Cho et al. | |
| 2002/0062334 A1* | 5/2002 | Chen et al. | 709/200 |
| 2002/0129126 A1* | 9/2002 | Chu et al. | 709/220 |
| 2002/0144139 A1* | 10/2002 | Ladwig | 713/200 |
| 2004/0059798 A1* | 3/2004 | Glitho et al. | 709/219 |

FOREIGN PATENT DOCUMENTS

| | | |
|---|---|---|
| JP | 2000-029847 A | 1/2000 |

OTHER PUBLICATIONS

Kanezashi, Fumiaki et al. "Distributed Pres: A Presentation System based on Mobile Agent." Collected Essays of the Multimedia, Distributed, Cooperative and Model Symposium. IPSJ Symposium Series, vol. 2000, No. 7, Jun. 28-30, 2000.*

Tai, Hideki et al. "The Present State of Mobile Agent Technology and Future Issues." Computer Software vol. 16, No. 5, Sep. 1999.*

Mitsubishi Electric ITA. "Mobile Agent Computing." A White Paper. Jan. 19, 1998.*

Straber, Markus et al. "MOLE—A Java Based Mobile Agent System." University of Stuttgart. Oct. 23, 1996.*

* cited by examiner

SECURITY POLICY

| AGENT IDENTIFICATION INFORMATION (AGENT ID/USER ID) | COMPONENT | | | | |
|---|---|---|---|---|---|
| | CREATION SOURCE | AUTHENTICATION SOURCE | QUALITY STANDARD | PERFORMANCE STANDARD | AUTHORITY STANDARD |
| EG1/abc | | | | | "MAKE A CALL" "REFER TO AN ADDRESS BOOK" "MAKE AN INQUIRY TO USER" ...... |
| EG2/def | | V1 V2 | | | "REFER TO AN ADDRESS BOOK" "MAKE AN INQUIRY TO USER" |
| xxx/xxx | "ghi" | V1 | LAST T1 "A" LAST T2 "A" ...... | SIZE "m1" | "MAKE AN INQUIRY TO USER" |

F I G. 2

AUTHENTICATION INFORMATION OF COMPONENT

| CREATION SOURCE INFORMATION | "ghi" |
| AUTHENTICATION SOURCE INFORMATION | "V1" |
| QUALITY STANDARD INFORMATION | TEST T1 "A" 、 TEST T2 "A" ··· |
| PERFORMANCE STANDARD INFORMATION | SIZE "m1" ··· |
| AUTHORITY STANDARD INFORMATION | "MAKE AN INQUIRY TO USER" |

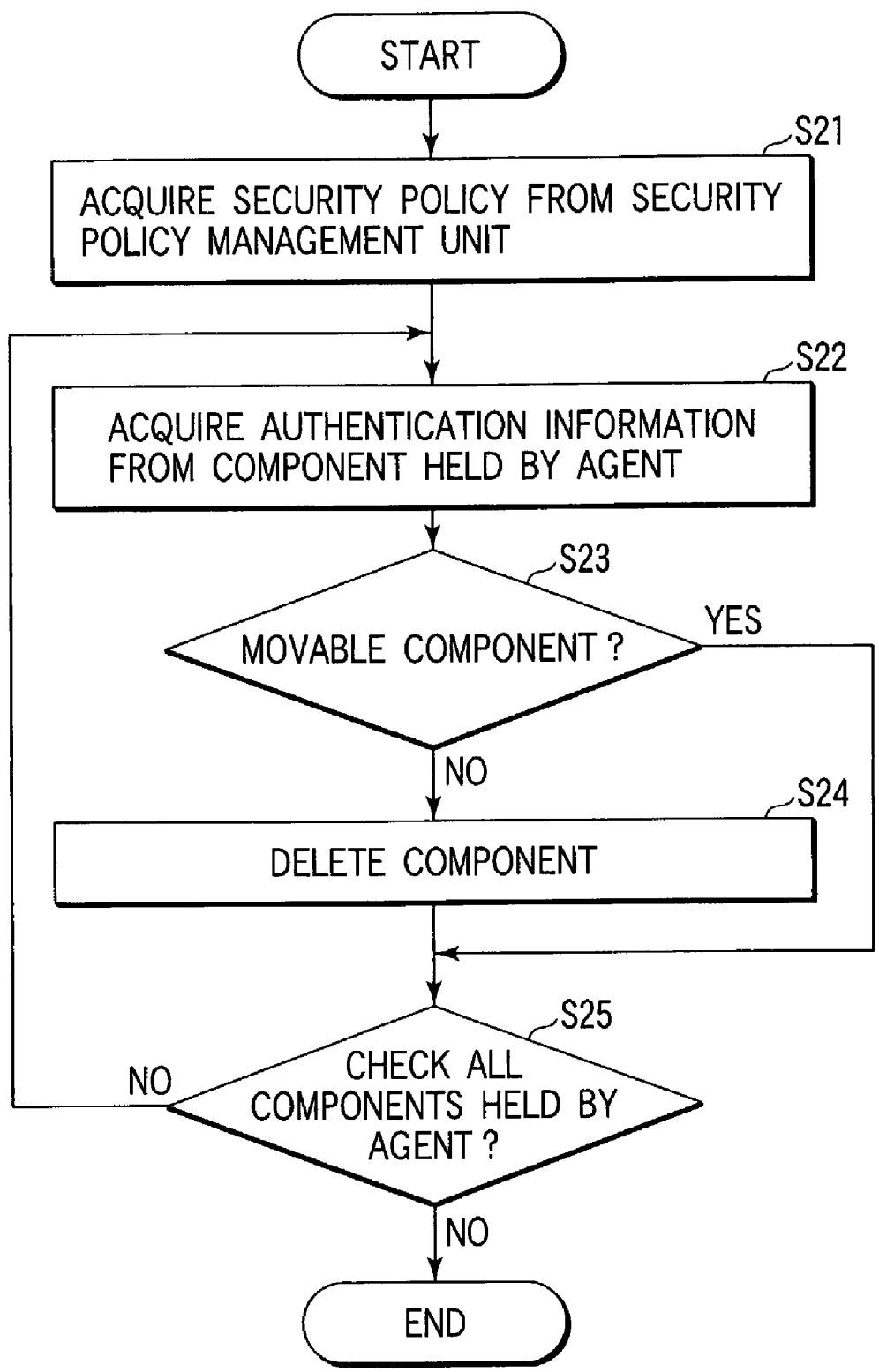
F I G. 7

| SECURITY POLICY | | | | | | |
|---|---|---|---|---|---|---|
| AGENT IDENTIFICATION INFORMATION (AGENT ID/USER ID) | COMPONENT | | | | | |
| | CREATION SOURCE | AUTHENTICATION SOURCE | QUALITY STANDARD | PERFORMANCE STANDARD | AUTHORITY STANDARD | |
| EG1/abc | | | | | "MAKE A CALL" "REFER TO AN ADDRESS BOOK" "MAKE AN INQUIRY TO USER" ...... "PLANNER" | |
| EG2/def | | V1 V2 V1 | | | "REFER TO AN ADDRESS BOOK" "MAKE AN INQUIRY TO USER" "PLANNER" | |
| xxx/xxx | "ghi" | V1 | LAST T1 "A" LAST T2 "A" ...... | SIZE "m1" | "MAKE AN INQUIRY TO USER" | |

F I G. 10

ADJUSTABLE MOBILE AGENT

CROSS-REFERENCE TO RELATED APPLICATIONS

This application is based upon and claims the benefit of priority from the prior Japanese Patent Application No. 2001-230309, filed Jul. 30, 2001, the entire contents of which are incorporated herein by reference.

BACKGROUND OF THE INVENTION

1. Field of the Invention

The present invention relates to a mobile agent system in which an agent moves between, e.g., network-connected information devices and performs processing.

2. Description of the Related Art

A mobile agent system has conventionally been known as a technique of moving between network-connected information devices, and integrating and processing pieces of information on the information devices. The agent is an autonomous software processing unit which is constructed by data in an executable form, its executable state, and data used for execution. In the mobile agent system, such an agent processes information on a given information device.

The mobile agent moves and operates between a plurality of information devices. The operation authority which defines processes the agent performs on each device is determined from the type of agent and the settings of each information device. The operation authority of the agent is controlled by a method of laying a specific interface unique to each information device open to the agent and restricting the agent operation to only ones via the interface. The operation authority is fixed for each information device.

Each of the information devices between which the agent moves has a platform which provides an environment where the agent operates, e.g., one which provides an environment where an agent constructed on the Operating System (OS) of a computer or the like operates.

A destination information device to which the agent is to move determines whether to accept the agent on the basis of identification information of the agent. An agent whose security cannot be determined from identification information is inhibited from moving to the device. Even an agent which is permitted to move uniformly performs only permitted operations regardless of the identification information of the agent.

In this manner, the operation of the agent accepted by the destination device is restricted.

When movement of an agent or the operation of the agent at a destination are to be restricted, the prior art imposes only uniform, fixed restrictions on the basic identification information of the agent and predetermined operations permitted in the destination information device regardless of the type or function of the agent.

BRIEF SUMMARY OF THE INVENTION

The present invention has its object to provide an information processing method capable of flexibly changing the operation of an agent within the range of restrictions preset in a destination information device for the agent when the agent moves between devices, and an information processing apparatus using the same.

According to embodiments of the present invention, there is provided an information processing method between a first information processing apparatus as one of a plurality of network-connected information processing apparatuses and a second information processing apparatus as another one of the plurality of network-connected information processing apparatuses. The method includes storing, in the first information processing apparatus, a plurality of programs which execute processing to cope with a user request; storing, in the second information processing apparatus, restriction information used for selecting authorized programs for which executions are authorized within the second information processing apparatus; transferring the restriction information from the second information processing apparatus to the first information processing apparatus; and moving at least one program selected from among the plurality of programs, of which execution authorization is checked based on the restriction information, from the first information processing apparatus to the second information processing apparatus.

BRIEF DESCRIPTION OF THE SEVERAL VIEWS OF THE DRAWING

FIG. 2 is a table showing examples of a security policy;

FIG. 7 is a flow chart for explaining the processing operation of an agent-holding component check unit in steps in FIG. 6 in more detail;

FIG. 10 is a table showing examples of a security policy when the agent comprises the planner component.

DETAILED DESCRIPTION OF THE INVENTION

Embodiments of the present invention will be described below with reference to the several views of the accompanying drawing.

An agent described in the embodiments according to the present invention moves between information devices (information processing apparatuses) while holding components in order to meet a user request. In movement, the agent particularly holds only components which comply with the security policy of a destination information device.

The first embodiment of the present invention will describe such an agent function, mobile component function, and platform function with which the agent moves between information devices.

Figure 1:
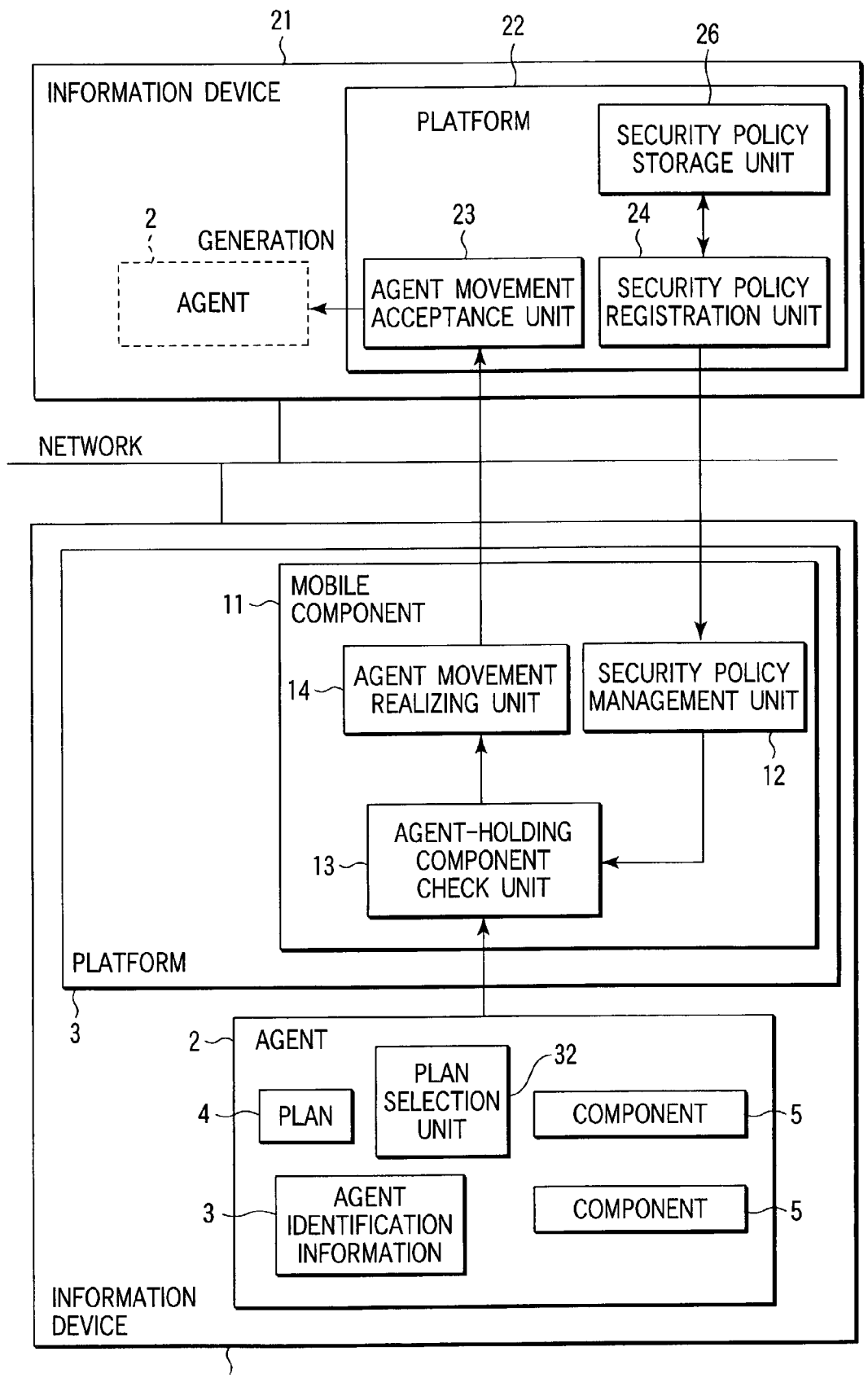
FIG. 1 is a block diagram showing the overall arrangement of an information processing system according to the first embodiment of the present invention.

FIG. 1 shows the overall arrangement of an information processing system according to the first embodiment. This system is constructed by information devices 1 and 21 such as a plurality of network-connected personal computers or portable information terminals such as Personal Digital Assistants (PDAs) and portable telephones. An agent 2 operates on a given information device (to be referred to as the information device 1 in this case), and further moves via a network to another information device (to be referred to as the information device 21 in this case) where the agent also operates.

The information devices 1 and 21 respectively have platforms 33 and 22 which operate using the execution environments of the respective information devices. The agent 2 operates under an execution environment which is provided from the platform. The agent 2 moves between the information devices 1 and 21, and executes processing for handling a request input by the user (solving a proposition) on a platform in a destination information device instead of the user.

The agent 2 has one or a plurality of handling methods (solving methods) comprised of at least one processing step for handling a certain request, i.e., plans. The agent 2 also has one or a plurality of components 5 which execute the processing step included in the plans. The component is a program for executing the processing step on the platform.

Assume that an information device receives a request (proposition) "search for the telephone number of Mr. Tanaka". A plan for handling this request is input by, e.g., the user. For example, the following two plans are input to the agent 2. The priority concerning preferential selection of either plan is also set by the user in advance. In this case, the first plan has a higher priority.

First plan: "search the address book of the information device 21 for the telephone number of Mr. Tanaka."
Second plan: "inquire the telephone number of Mr. Tanaka of the user of the information device 21."

These plans (processing steps thereof) are executed by components.

Therefore, the components include a component which executes processing for making an inquiry to the user, a component which executes processing of acquiring and referring to an address book from a portable telephone, and a component which executes processing of making a call from a portable telephone.

Components are not limited to the above-described ones. The processing of such a component may be subdivided into respective components. A component which executes processing of making a call from a portable telephone may be adopted, or a component which makes a call from an IP telephone service and a component which makes a call using an existing telephone service may be employed.

A platform in an information device which receives movement of the agent (e.g., the platform 22 of the information device 21) comprises an agent movement acceptance unit 23 which accepts agent information sent via a network and generates an agent, a security policy storage unit 26, and a security policy registration unit 24 which registers in the destination information device 1 an agent security policy to be accepted by the agent movement acceptance unit 23 out of security policies stored in the security policy storage unit 26.

The security policy of the information device 21 is information for restricting the operation of an agent within the information device 21 for each agent. That is, the security policy is information for restricting execution of components on the information device 21. In this embodiment, the security policy defines components which can be executed on the information device 21 for each agent.

Note that the security policy defines components which can be executed on the information device 21 for each agent. However, the security policy is not limited to this, and may define components which cannot be executed on the information device 21. In short, the security policy restricts the operation of each agent on each information device.

As shown in FIG. 2, the security policy stored in the security policy storage unit 26 is table information representing with which component an agent having given agent identification information can move to the information device 21.

The agent identification information contains, e.g., an identifier (agent ID) for identifying each agent and an identifier (user ID) of a user who has generated the agent. The agent identification information is referred to as an "agent ID/user ID".

Each component has authentication information. The authentication information contains creation source information as information for identifying a creation source user or organization which has created a component, authentication source information as information for identifying an authentication source user or organization which has authenticated the component, quality standard information representing the results of a quality test conducted for the component by the authentication source, performance standard information as information representing the degree (e.g., size) of computer resource (e.g., memory resource) required by the component, and authority standard information as information about a component function (processing contents) of whether the component communicates with an external device or reads/writes private information in a device.

The security policy of the information device 21 shown in FIG. 2 specifies, for each agent in correspondence with its identification information, authentication information of executable components which can be brought into the information device 21 by the agent. As shown FIG. 2, the security policy specifies only necessary information out of the creation source, authentication source, quality standard, performance standard, and authority standard contained in authentication information.

For example, the user ID of the user of the information device 21 is "abc", and agent identification information of the information device 21 of the user is "EG1/abc". For an agent with agent identification information "EG1/abc", the security policy shown in FIG. 2 permits bringing components with authority standards "make a call", "refer to an address book", and "make an inquiry to the user" regardless of the creation source, authentication source, quality standard, and performance standard. For an agent with agent identification information "EG2/def" generated by a specific individual (user ID "def"), the security policy permits bringing a component with an authority standard "refer to an address book" authenticated by "V1" and a component with an authority standard "make an inquiry to the user" authenticated by "V2", regardless of their creation source, quality standard, and performance standard. However, the security policy does not permit bringing other components. For another agent (agent identification information "xxx/xxx" which means that no user ID or agent ID is specified), the security policy permits bringing only a component with an authority standard "make an inquiry to the user" which is generated by "ghi", authenticated by "V1", and satisfies predetermined quality and performance standards.

In this manner, security policies as shown in FIG. 2 are set for the information device 21. When, for example, the information device 21 is a portable telephone, the agent of the user "abc" of the information device 21 is permitted to bring a component which makes a call from the portable telephone. An agent generated by a specific individual, e.g. "def", is permitted to bring a component which refers to an address book in the portable telephone. Other general agents are permitted to bring components which make an inquiry to the user.

Referring back to FIG. 1, the "source" platform, e.g., the platform 33 of the information device 1 in this embodiment from which an agent moves has a mobile component 11.

The mobile component 11 is a component which performs processing of moving the agent 2 to the information device 21 via the network in accordance with a request from the agent 2.

The mobile component 11 comprises a security policy management unit 12 which receives a security policy transmitted from the security policy registration unit 24 of a destination platform. Further, the mobile component 11 comprises an agent-holding component check unit 13. When the agent 2 issues a request to move to the information device 21, the agent-holding component check unit 13 checks the components 5 held by the agent 2 with reference to the security policy transmitted to the security policy management unit 12. Then, the agent-holding component check unit 13 selects a component to be brought into the destination platform on the basis of the security policy (e.g., deletes components which cannot be executed in the destination platform, and selects a component to be brought into the destination platform). The mobile component 11 also comprises an agent movement realizing unit 14 which transmits the agent 2 holding at least the selected component to the agent movement acceptance unit 23 in the information device 21.

In addition to one or a plurality of components 5, the agent 2 has an agent identification information storage unit 3 which stores the above-mentioned agent identification information, a plan storage unit 4 which stores a plan input by the user, and a plan selection unit 32.

The plan selection unit 32 checks whether a currently selected plan (with the highest priority at that time) can be executed using a component currently held by the agent. If necessary, the plan selection unit 32 selects another executable plan using the component currently held by the agent from plans stored in the plan storage unit 4.

Plans stored in the plan storage unit 4 are directly input by the user.

Figure 3:
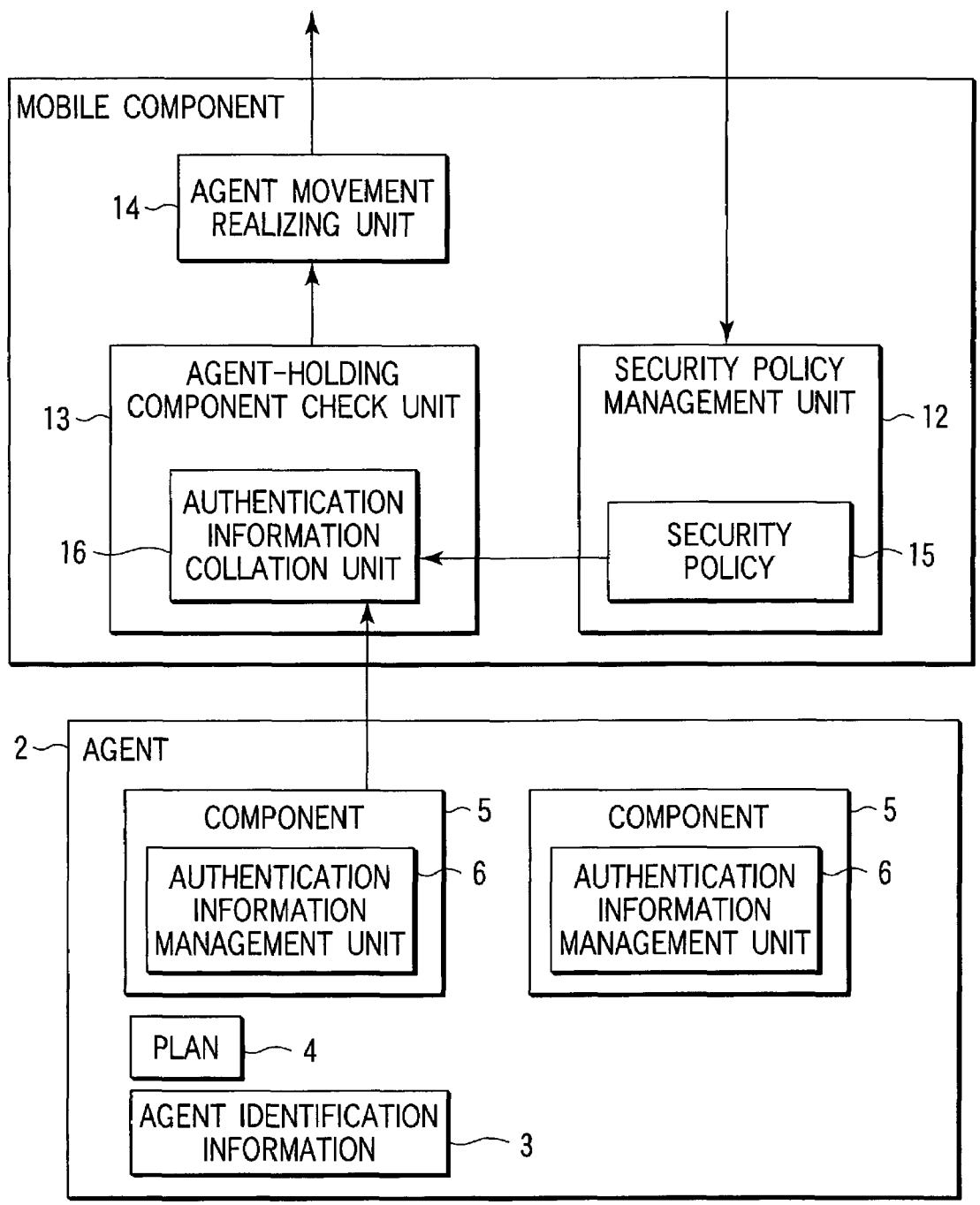
FIG. 3 is a block diagram showing the arrangement of an information device 1 in FIG. 1 in more detail.

FIG. 3 shows the arrangement of the information device 1 in more detail. FIG. 3 shows the arrangement of a main part for the agent-holding component check unit 13 to check components held by the agent by inquiring the security policy management unit 12.

Figures 4, 5:
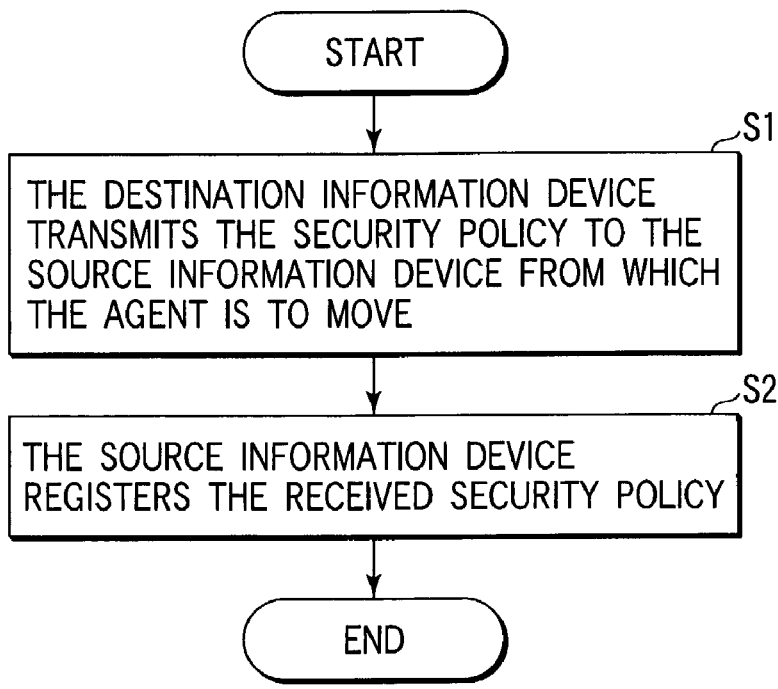
FIG. 4 is a table showing a storage example of authority standard of each component.
FIG. 5 is a flow chart for explaining pre-processing between first and second information devices for accepting movement of an agent from first information device by the second information device when the agent moves from the first information device to the second information device.

Each component 5 has an authentication information management unit 6 which stores and manages authentication information of the component, as shown in FIG. 4.

The security policy management unit 12 stores and manages a security policy 15 transmitted from the security policy registration unit 24 of the source information device.

The agent-holding component check unit 13 has an authentication information collation unit 16. The authentication information collation unit 16 collates the security policy of the destination information device stored in the security policy management unit 12 with authentication information of each component 5 held by the agent 2, and determines whether to permit bringing each component 5.

The processing operation of the information processing system in FIG. 1 will be explained with reference to the flow charts of FIGS. 5 to 7.

The flow chart of FIG. 5 explains pre-processing between the information devices 1 and 21. The pre-processing include a step of accepting movement of the agent from the information device 1 by the information device 21 when the agent 2 moves from the information device 1 to the information device 21.

For example, when the agent 2 asks the mobile component 11 to move to the information device 21, the security policy management unit 12 transmits agent identification information of the agent 2 to the platform 22 of the information device 21, and inquires about a security policy. Then, the security policy registration unit 24 transmits a security policy corresponding to agent identification information of the agent 2 (step S1). At this time, identification information (ID) which is defined for the platform 22 and identifies the platform may also be transmitted together with the security policy. The security policy management unit 12 may receive all security policies from the security policy registration unit 24 without transmitting agent identification information of the agent 2 to the platform 22 of the information device 21.

The security policy management unit 12 in the mobile component 11 registers the received security policy (step S2). The security policy management unit 12 pairs the received security policy with the ID of the destination platform 22 or the like, and manages them in a table format.

Figure 6:
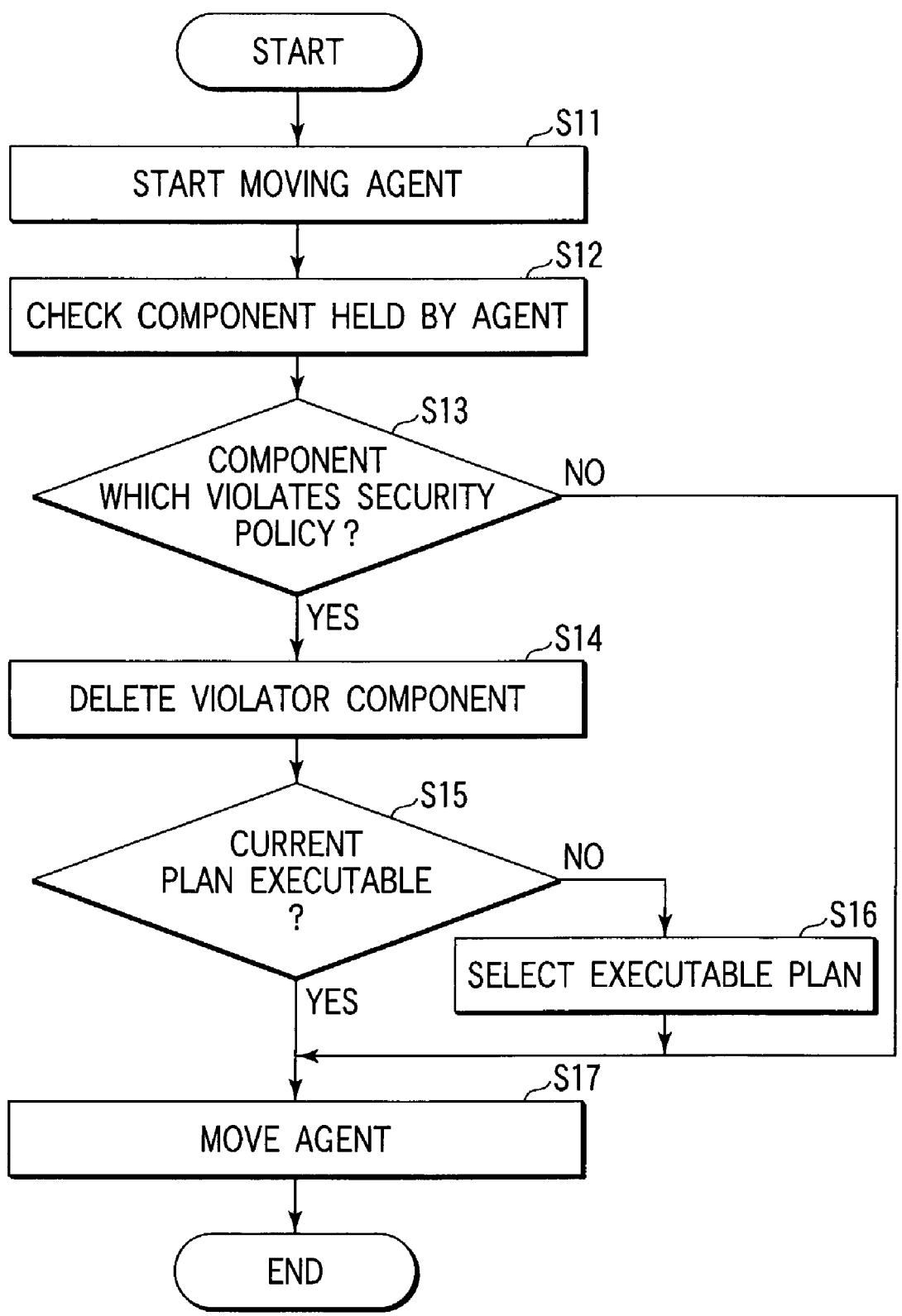
FIG. 6 is a flow chart for explaining a processing operation when the agent moves from the first information device to the second information device.

The flow chart of FIG. 6 explains a processing operation when the agent 2 moves from the information device 1 to the information device 21 by using the mobile component 11.

The agent 2 designates a destination information device (or a platform thereof) with respect to the mobile component 11, and asks the mobile component 11 to move (step S1). Then, the mobile component 11 acquires a security policy from the destination information device, as shown in FIG. 5. Then, the agent-holding component check unit 13 checks components held by the agent 2 by collating them with the security policy (step S12).

If the components held by the agent 2 include a component which violates the security policy, the component is deleted from the agent 2 (steps S13 and S14). The component can be deleted by erasing the component from the agent 2, or by temporarily confiscating the component from the agent 2 and returning it when the agent 2 returns to the information device 1.

If the component is deleted from the agent 2, the plan selection unit 32 checks whether the current plan can be executed by the remaining components (step S15). If YES in step S15, the current plan is adopted; if NO, a plan executable by only the remaining components is selected (step S16).

After that, the agent moves to the information device 21 by using the agent movement realizing unit 14 and agent movement acceptance unit 23 (step S17).

The processing operation of the agent-holding component check unit 13 in steps S12 to S14 in FIG. 6 will be described in more detail with reference to the flow chart of FIG. 7.

The authentication information collation unit 16 of the agent-holding component check unit 13 acquires the security policy of the information device 21 (security policy corresponding to identification information of the agent) registered in the security policy management unit 12 (step S21).

The authentication information collation unit 16 checks pieces of authentication information of the components 5 in the agent 2 one by one. More specifically, the authentication information collation unit 16 acquires authentication information of each component 5 from the authentication information management unit 6 of the component 5 (step S22). The authentication information collation unit 16 collates the authentication information with the security policy corresponding to identification information of the agent. If authentication information of the component contains content which violates the security policy corresponding to identification information of the agent, the agent-holding component check unit 13 deletes the component from the agent 2 (steps S23 and S24).

The agent-holding component check unit 13 performs this processing for all the components held by the agent 2 (step S25).

For example, when agent identification information of the agent 2 is "EG2/def", the security policy (see FIG. 2) of the information device 21 permits the agent to bring (execute) a component with an authority standard "refer to an address book" authenticated by "V1" and a component with an authority standard "make an inquiry to the user" authenticated by "V2". The agent 2 holds a component with an authority standard "refer to an address book" authenticated by "V1", a component with an authority standard "make an inquiry to the user" authenticated by "V2", and a component with an authority standard "make a call" authenticated by "V1".

The agent-holding component check unit 13 deletes, from the three components held by the agent 2, the component with the authority standard "make a call" which violates the security policy corresponding to the agent identification information "EG2/def".

The agent 2 holds the component with the authority standard "refer to an address book". If, however, the component is authenticated not by "V1" but by "V2", this component also violates the security policy and is deleted.

Processes in steps S15 and S16 in FIG. 6 will be described in detail.

Assume that agent identification information of the agent 2 is "EG2/def", and the current plan is the first plan "search the address book of the information device 21 for the telephone number of Mr. Tanaka". The agent 2 holds a component with an authority standard "refer to an address book" authenticated by "V1", a component with an authority standard "make an inquiry to the user" authenticated by "V2", and a component with an authority standard "make a call" authenticated by "V1".

In this case, the security policy (see FIG. 2) of the information device 21 permits the agent 2 to bring (execute) a component with an authority standard "refer to an address book" authenticated by "V1" and a component with an authority standard "make an inquiry to the user" authenticated by "V2". In processing of FIG. 7, the agent-holding component check unit 13 deletes, from the three components held by the agent 2, the component with the authority standard "make a call" which violates the security policy corresponding to the agent identification information "EG2/def".

Even if the component with the authority standard "make a call" is deleted in the check of step S15 in FIG. 6, the current plan (first plan) can be executed. Thus, the flow skips step S16 and advances to step S17.

If the component with the authority standard "refer to an address book" held by the agent 2 is authenticated not by "V1" but by "V2", this component also violates the security policy and is deleted in processing of FIG. 7. In this case, the component with the authority standard "make a call" and the component with the authority standard "refer to an address book" are deleted in the check of step S15 in FIG. 6. Hence, the current plan (first plan) is determined to be unexecutable. If another plan is stored in the plan storage unit 4 and can be executed by only the currently remaining component, the plan selection unit 32 selects this plan in step S16. For example, the second plan is stored in the plan storage unit 4 in addition to the first plan. Since the second plan can be executed by the currently remaining component with the authority standard "make an inquiry to the user", the plan selection unit 32 selects the second plan.

In step S17 of FIG. 6, the agent executes processing of the second plan upon moving to the information device 21 by using the agent movement realizing unit 14 and agent movement acceptance unit 23. In this case, the agent 2 generated in the information device 21 displays a dialogue which inquires about the telephone number of Mr. Tanaka.

As described above, according to the first embodiment, when the agent 2 moves from the information device 1 to the information device 21, components except components which can be brought into the information device 21 are deleted from components held by the agent 2 on the basis of a security policy (restriction information) which is transmitted from the information device 21 and corresponds to the agent 2. At this time, if the current plan cannot be executed, another plan executable using the remaining components is selected, and processing corresponding to the plan is executed in the information device 21. Accordingly, when the agent moves between devices, the operation of the agent can be flexibly changed within the range of restrictions posed in advance in a destination information device for the agent.

More specifically, in the first embodiment according to the present invention, (1) The agent holds a plurality of components.

(2) When the agent moves, components to be brought into a destination platform are selected in accordance with the security policy of the destination platform (in this case, components which cannot be executed in the destination platform are deleted from the agent).

(3) After components are deleted, the agent changes its operation (plan), as needed.

(4) The security policy is set in accordance with agent identification information and component authentication information.

Therefore, fine security policies using identification information of an agent and authentication information of each component held by the agent can be applied to the agent which moves to a given information device. After a security policy is applied, the agent can change its operation (plan) to replace processing by an operation executable within the security policy.

In the first embodiment, the plan storage unit 4 stores one or a plurality of plans input by the user.

In the second embodiment, a planner component generates a plurality of plans for meeting a request input by the user. A plan executable within the range of components which comply with the security policy of a destination information device is selected from the plurality of plans. Note that only a difference from the first embodiment will be explained.

Figure 8:
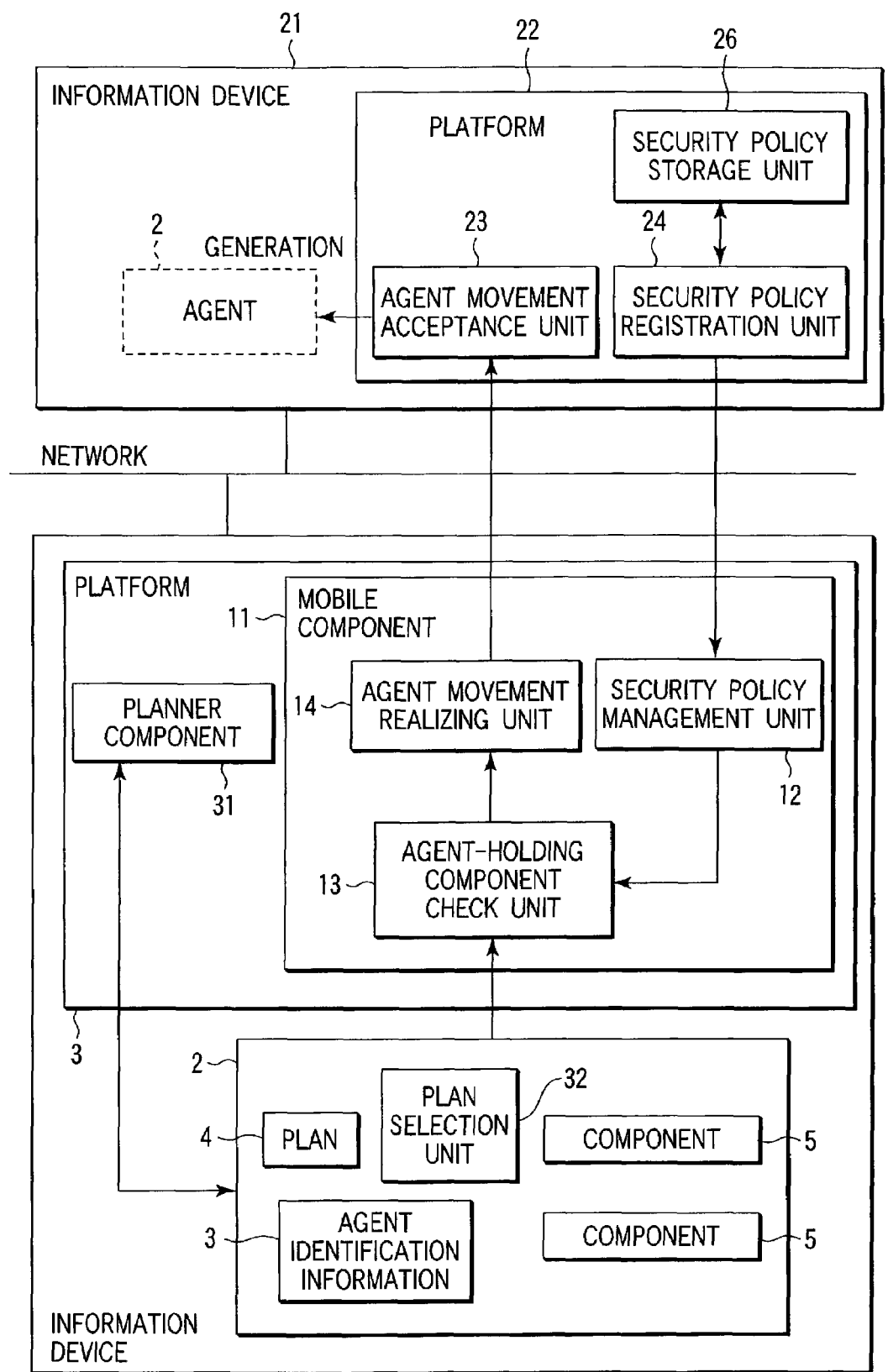
FIG. 8 is a block diagram showing the overall arrangement of an information processing system according to the second embodiment of the present invention when a platform comprises a planner component.

FIG. 8 shows the overall arrangement of an information processing system according to the second embodiment. In FIG. 8, the same reference numerals as in FIG. 1 denote the same parts, and only a difference will be described. A platform 33 of an information device 1 comprises a planner component 31, and one or a plurality of plans generated by the planner component 31 are stored in a plan storage unit 4.

The planner component 31 generates a plurality of handling methods, i.e., plans each formed from at least one processing step for handling a user request. A plurality of planner components 31 exist for each type of processes such as search and scheduling. For descriptive convenience, a search planner component which generates a plurality of telephone number search plans will be explained. The search planner component stores a plurality of model plans in a table format in advance. The model plans include, e.g., "search the address book of an information device 21 for a telephone number" and "make an inquiry to the user of the information device 21". For example, an agent 2 receives a request "search for the telephone number of Mr. Tanaka" from the user. The agent 2 asks the planner component 31 via the platform 33 to generate a plan which responds to this request. The planner component 31 generates, e.g., the following two plans in response to this request.

First plan: "search the address book of the information device 21 for the telephone number of Mr. Tanaka."

Second plan: "inquire the telephone number of Mr. Tanaka of the user of the information device 21."

Once a plurality of plans are generated, these plans are desirably assigned priorities which determine which of the plans is to be preferentially used. The priority may be set for a model plan in advance in order to more reliably process a request. In generating plans, the planner component 31 may set priority for each plan by referring to agent knowledge (not shown in FIG. 8). The agent knowledge includes plan generation conditions designated by the user, such as priority as to the processing time, priority as to resource saving, functions usable on the platform, and information about components. Under the condition that priority is given to the processing time, the priority of a plan with a shorter processing time is set higher among model plans.

The second embodiment is the same as the first embodiment expect that one or a plurality of plans generated by the planner component 31 are stored in the plan storage unit 4.

In this manner, a plurality of plans for meeting a request from the user is generated using the planner component. A handling method executable by the agent can be automatically generated, and a request from the agent can be more reliably met. In other words, a response to the request from the user can be more reliably obtained.

In the second embodiment, the planner component 31 is arranged in the platform 33. In the third embodiment, an agent 2 holds a planner component 31, and if the planner component 31 complies with the security policy of a destination information device, the agent 2 can bring the planner component 31 to the destination information device.

Figure 9:
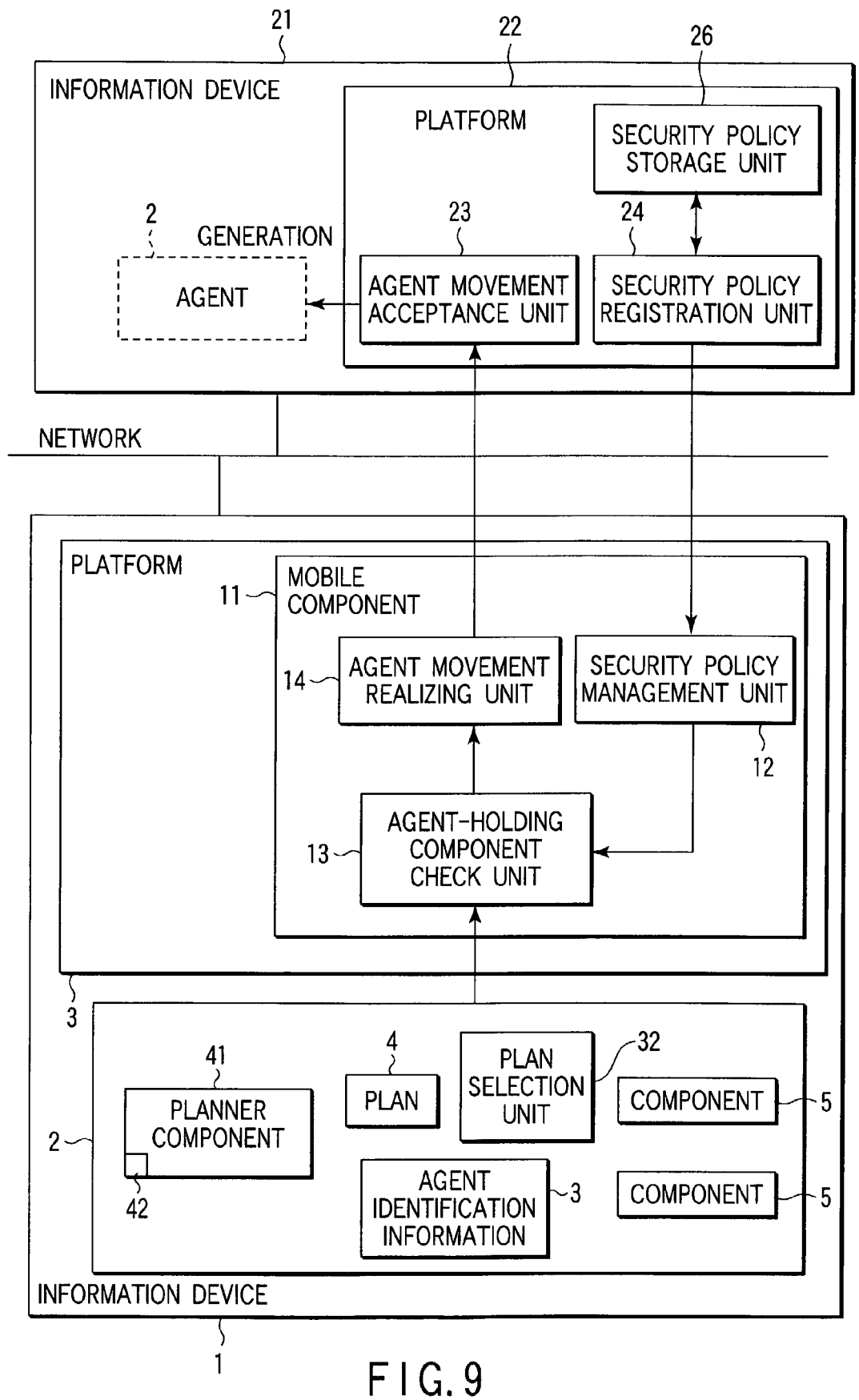
FIG. 9 is a block diagram showing the overall arrangement of an information processing system according to the third embodiment of the present invention when an agent comprises a planner component.

FIG. 9 shows the overall arrangement of an information processing system according to the third embodiment. In FIG. 9, the same reference numerals as in FIG. 1 denote the same parts, and only a difference will be described. The agent 2 of an information device 1 comprises a planner component 41, and one or a plurality of plans generated by the planner component 41 are stored in a plan storage unit 4.

The planner component 41 is identical to the planner component 31 described in the second embodiment.

Similar to other components, authentication information of the planner component 41 as shown in FIG. 4 is stored in an authentication information management unit 42.

In the third embodiment, when the security policy of a destination information device (e.g., an information device 21) permits bringing a component with an authority standard "generate a plan (planner)", as shown in FIG. 10, the agent 2 can move to the information device 21 while holding the planner component 41, as shown in FIG. 6.

If the agent 2 can bring the planner component 41 into the destination information device 21, the agent 2 can generate a new plan by using the component as far as the destination information device 21 comprises a component permitted to cope with the agent.

Another movement operation of an agent 2 in the arrangement as shown in FIG. 8 or 9 will be explained in detail.

Assume that agent identification information of the agent 2 is "EG2/def", and the first and second plans are generated by a planner component 41 and stored in a plan storage unit 4. The agent 2 holds a component with an authority standard "refer to an address book" authenticated by "V3", a component with an authority standard "make an inquiry to the user" authenticated by "V2", and a component with an authority standard "make a call" authenticated by "V1".

In this case, the security policy (see FIG. 10) of an information device 21 permits the agent 2 to bring (execute) the component with the authority standard "make an inquiry to the user" authenticated by "V2". At this time, in processing of FIG. 7, an agent-holding component check unit 13 deletes, from the three components held by the agent 2, the component with the authority standard "refer to an address book" and the component with the authority standard "make a call" which violate the security policy corresponding to the agent identification information "EG2/def".

In this case, the component with the authority standard "refer to an address book" and the component with the authority standard "make a call" are deleted in the check of step S15 in FIG. 6. As a result, the current plan (first plan) is determined to be unexecutable. In step S16, a plan selection unit 32 selects the second plan which is another plan stored in the plan storage unit 4 and is executable by the currently remaining component.

In step S17 of FIG. 6, the agent 2 moves to the information device 21 while holding the component with the authority standard "make an inquiry to the user".

Assume that a platform 22 of the information device 21 has a component with an authority standard "refer to an address book" authenticated by "V1" that complies with a security policy corresponding to the agent identification information "EG2/def". In this case, the plan selection unit 32 of the agent 2 which has moved to the information device 21 is notified of the presence of the component with the authority standard "refer to an address book" authenticated by "V1". Since the first plan with higher priority than the current plan can be executed, the plan selection unit 32 reselects the first plan.

The agent 2 executes the first plan by using the component with the authority standard "refer to an address book" present in the destination information device 21.

If a component which allows reselecting the plan does not exist in the destination information device 21, the agent 2 executes the previously selected second plan.

In this fashion, the agent 2 can reselect the plan at a destination when the agent 2 does not hold a component which complies with the security policy of a destination information device, the destination information device has a component which complies with a security policy corresponding to the agent, and a higher-priority plan can be executed by using the component of the destination information device.

The methods described in the first to fourth embodiments can be stored and distributed as a program capable of causing a computer to execute these methods in a recording medium such as a DVD, CD-ROM, floppy disk, solid-state memory, or optical disk.

The present invention is not limited to the agent system, and can also be applied when a program is moved from a given information device to another information device and runs on the destination information device, for example, when a Java applet (TM) is downloaded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing method between a first information processing apparatus as one of a plurality of network connected information processing apparatuses and a second information processing apparatus as another one of the plurality of network connected information processing apparatuses, the method comprising:

selecting a first plan to handle a user request, the first plan including a sequence of sub-goals, wherein the sub-goals are achieved by a plurality of program-components corresponding thereto, each program-component including authority standard information relating to a component function of whether the program-component communicates with an external device or reads/writes private information in a device;

generating an agent containing the plurality of program-components in the first information processing apparatus;

storing, in the second information processing apparatus, restriction information used for selecting authorized program-components contained in the agent, of which executions are authorized within the second information processing apparatus, the restriction information including at least one of a creation source, an authentication source, quality of a program-component capable of running on the second information processing apparatus, authority standard by which the program-components are authorized, and processing content performed by the program-component;

transferring the restriction information from the second information processing apparatus to the first information processing apparatus before the agent moves from the first information processing apparatus to the second information processing apparatus;

modifying, in the first information processing apparatus, the agent by removing at least one program-component from the plurality of program-components, of which execution is not authorized within the second information processing apparatus, when the authority standard information does not match the authority standard included in the restriction information transferred from the second information processing apparatus;

moving the modified agent from the first information processing apparatus to the second information processing apparatus if the first plan is executable by the modified agent; and selecting a second plan when the first plan is not executable by the modified agent.

2. A first information processing apparatus which executes processing on an information device to handle a user request by use of a second information processing apparatus storing restriction information used for selecting authorized program-components of which executions are authorized within the second information processing apparatus, the first information processing apparatus comprising:

a selector which selects a first plan to handle a user request, the first plan including a sequence of sub-goals, wherein the sub-goals are achieved by execution of a plurality of program-components, each program-component including authority standard information relating to a component function of whether the program-component communicates with an external device or reads/writes private information in a device;

a generator which generates an agent containing the plurality of program-components;

a receiver which receives the restriction information with respect to the agent from the second information processing apparatus, the restriction information including at least one of a creation source, an authentication source, quality of a program-component capable of running on the second information processing apparatus, authority standard by which the program-components are authorized, and processing content performed by the program;

a modifying device configured to modify the agent by removing at least one program-component from the plurality of program-components, of which execution is not authorized within the second information processing apparatus, when the authority standard information does not match the authority standard included in the restriction information received by the receiver; and a transmitter which transmits the modified agent to the second information processing apparatus if the first plan is executable by the modified agent, and wherein the selector selects a second plan when the first plan is not executable by the modified agent.

3. A computer program product comprising:

a computer storage medium and a computer program code mechanism embedded in the computer storage medium for causing a computer to execute processing to handle a user request by use of an information processing apparatus storing restriction information used for selecting authorized program-components of which executions are authorized within the information processing apparatus, the computer code mechanism comprising:

a code segment for selecting a first plan to handle a user request, the first plan including a sequence of sub-goals, wherein the sub-goals are achieved by execution of a plurality of program-components, each program-component including authority standard information relating to a component function of whether the program-component communicates with an external device or reads/writes private information in a device;

a code segment for generating an agent containing the plurality of program-components;

a code segment for receiving the restriction information with respect to the agent from the information processing apparatus, the restriction information including at least one of a creation source, an authentication source, quality of a program-component capable of running on the another information processing apparatus, authority standard by which the program-components are authorized, and processing content performed by the program;

a code segment for modifying the agent by removing at least one program-component from the plurality of program-components, of which execution is not authorized within the another information processing apparatus, when the authority standard information does not match the authority standard in the received restriction information; and a code segment for transmitting the modified agent to the information processing apparatus if the first plan is executable by the modified agent; and a code segment for selecting a second plan when the first plan is not executable by the modified agent.

4. An information processing method between a first information processing apparatus as one of a plurality of network connected information processing apparatuses and a second information processing apparatus as another one of the plurality of network connected information processing apparatuses, the method comprising:

selecting a first plan to handle a user request, the first plan including a sequence of sub-goals, wherein the sub-goals are achieved by execution of a plurality of program-components, each program-component including authority standard information relating to a component function of whether the program-component communicates with an external device or reads/writes private information in a device;

generating an agent containing the plurality of program-components in the first information processing apparatus;

storing, in the second information processing apparatus, restriction information used for selecting authorized program-components contained in the agent, of which executions are authorized within the second information processing apparatus, the restriction information including two or more of a creation source, an authentication source, performance, quality of a program-component capable of running on the second information processing apparatus, authority standard by which the program-components are authorized, and processing content performed by the program-component;

transferring the restriction information from the second information processing apparatus to the first information processing apparatus before the agent moves from the first information processing apparatus to the second information processing apparatus;

modifying the agent by removing at least one program-component from the plurality of program-components, of which execution is not authorized within the second information processing apparatus, when the authority standard information does not match the authority standard in the restriction information transferred from the second information processing apparatus;

moving the modified agent from the first information processing apparatus to the second information processing apparatus if the first plan is executable by the modified agent; and selecting a second plan when the first plan is not executable by the modified agent.

5. A first information processing apparatus which executes processing on an information device to handle a user request by use of a second information processing apparatus storing restriction information used for selecting authorized program-components of which executions are authorized within the second information processing apparatus, the first information processing apparatus comprising:

a selector which selects a first plan to handle a user request, the first plan including a sequence of sub-goals, wherein the sub-goals are achieved by execution of a plurality of program-components, each program-component including authority standard information relating to a component function of whether the program-component communicates with an external device or reads/writes private information in a device;

a generator which generates an agent containing the plurality of program-components;

a receiver which receives the restriction information with respect to the agent from the second information processing apparatus, the restriction information including two or more of a creation source, an authentication source, performance, quality of a program-component capable of running on the second information processing apparatus, authority standard by which the program-components are authorized, and processing content performed by the program;

a modifying device configured to modify the agent by removing at least one program-component from the plurality of program-components, of which execution is not authorized within the second information processing apparatus, when the authority standard information does not match the authority standard in the restriction information received by the receiver; and a transmitter which transmits the modified agent to the second information processing apparatus if the first plan is executable by a modified agent, and wherein the selector selects a second plan when the first plan is not executable by the modified agent.

6. A computer program product comprising:

a computer storage medium and a computer program code mechanism embedded in the computer storage medium for causing a computer to execute processing to handle a user request by use of an information processing apparatus storing restriction information used for selecting authorized program-components of which executions are authorized within the information processing apparatus, the computer code mechanism comprising:

a code segment for selecting a first plan to handle a user request, the first plan including a sequence of sub-goals, wherein the sub-goals are achieved by execution of a plurality of program-components, each program-component including authority standard information relating to a component function of whether the program-component communicates with an external device or reads/writes private information in a device;

a code segment for generating an agent containing the plurality of program-components;

a code segment for receiving the restriction information with respect to the agent from the information processing apparatus, the restriction information including two or more of a creation source, an authentication source, performance, quality of a program-component capable of running on the another information processing apparatus, authority standard by which the program-components are authorized, and processing content performed by the program;

a code segment for modifying the agent by removing at least one program-component from the plurality of program-components, of which execution is not authorized within the another information processing apparatus, when the authority standard information does not match the authority standard in the received restriction information; and a code segment for transmitting the modified agent to the information processing apparatus if the first plan is executable by the modified agent; and a code segment for selecting a second plan when the first plan is not executable by the modified agent.

* * * * *